(12) United States Patent
Krishnan

(10) Patent No.: US 9,725,069 B2
(45) Date of Patent: Aug. 8, 2017

(54) KEYLESS VEHICLE SYSTEMS

(71) Applicant: Ford Global Technologies, LLC, Dearborn, MI (US)

(72) Inventor: Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/880,377

(22) Filed: Oct. 12, 2015

(65) Prior Publication Data
US 2017/0101076 A1 Apr. 13, 2017

(51) Int. Cl.
| B60R 25/00 | (2013.01) |
|---|---|
| B60R 25/20 | (2013.01) |
| H04W 4/00 | (2009.01) |
| E05B 77/00 | (2014.01) |
| E05B 81/76 | (2014.01) |

(Continued)

(52) U.S. Cl.
CPC ............ B60R 25/209 (2013.01); B60R 25/00 (2013.01); B60R 25/2045 (2013.01); E05B 77/00 (2013.01); E05B 81/04 (2013.01); E05B 81/76 (2013.01); E05B 81/78 (2013.01); E05B 81/82 (2013.01); H04W 4/008 (2013.01); B60R 25/23 (2013.01); B60R 25/403 (2013.01); B60R 2025/0405 (2013.01);
(Continued)

(58) Field of Classification Search
CPC .............. B60R 25/209; B60R 25/2045; B60R 2325/205; B60R 25/403; B60R 2025/0405; B60R 25/23; B60R 2325/105; B60R 2325/103; B60R 2325/101; H04W 4/008
See application file for complete search history.

(56) References Cited

U.S. PATENT DOCUMENTS

| 5,293,160 A | 3/1994 | Kurozu et al. |
|---|---|---|
| 6,871,121 B2 | 3/2005 | Tomson |

(Continued)

FOREIGN PATENT DOCUMENTS

| CN | 101527061 A | 9/2009 |
|---|---|---|
| CN | 102700480 A | 10/2012 |

(Continued)

OTHER PUBLICATIONS

PRWeb, "Keyfree Technologies Inc. Launches the First Digital Car Key," Jan. 9, 2014, 3 pages.
(Continued)

*Primary Examiner* — Genna Mott
(74) *Attorney, Agent, or Firm* — Jason C. Rogers; Price Heneveld LLP

(57) ABSTRACT

A keyless vehicle entry and start system for motor vehicles includes an input device such as a keypad and a backup electrical power supply to unlock the door latch in the event the primary power supply fails, thereby eliminating the need for a lock cylinder. The door latch system is configured to supply electrical power from the primary electrical power supply to unlock the latch upon receiving a signal from a mobile phone, and to supply electrical power from the backup electrical power supply to unlock the latch if an authorized code is input via the keypad. The system is configured to communicate with a portable wireless device such as a smartphone utilizing various frequency bands. The system permits entry and operation of a vehicle utilizing only a smartphone.

18 Claims, 14 Drawing Sheets

(51) Int. Cl.
*E05B 81/82* (2014.01)
*E05B 81/78* (2014.01)
*E05B 81/04* (2014.01)
*B60R 25/04* (2013.01)
*B60R 25/23* (2013.01)
*B60R 25/40* (2013.01)

(52) U.S. Cl.
CPC ... *B60R 2325/101* (2013.01); *B60R 2325/103* (2013.01); *B60R 2325/105* (2013.01); *B60R 2325/205* (2013.01)

(56) References Cited

U.S. PATENT DOCUMENTS

| | | | |
|---|---|---|---|
| 7,469,172 | B2 | 12/2008 | Shah |
| 7,928,829 | B2 | 4/2011 | Hermann |
| 8,126,450 | B2 | 2/2012 | Howarter et al. |
| 8,224,313 | B2 | 7/2012 | Howarter et al. |
| 8,494,765 | B2 | 7/2013 | Konet et al. |
| 8,509,986 | B1 | 8/2013 | Chen |
| 8,538,408 | B2 | 9/2013 | Howarter et al. |
| 8,736,438 | B1 | 5/2014 | Vasquez et al. |
| 8,768,565 | B2 | 7/2014 | Jefferies et al. |
| 8,965,287 | B2 | 2/2015 | Lam |
| 9,178,371 | B2 | 11/2015 | Koelsch |
| 9,184,777 | B2 | 11/2015 | Esselink et al. |
| 9,194,168 | B1 | 11/2015 | Lu et al. |
| 2008/0061931 | A1 | 3/2008 | Hermann |
| 2009/0177336 | A1 | 7/2009 | McClellan et al. |
| 2010/0075656 | A1 | 3/2010 | Howarter et al. |
| 2011/0060480 | A1 | 3/2011 | Mottla et al. |
| 2011/0112969 | A1 | 5/2011 | Zaid et al. |
| 2011/0313937 | A1 | 12/2011 | Moore, Jr. et al. |
| 2013/0069761 | A1 | 3/2013 | Tieman |
| 2013/0295913 | A1 | 11/2013 | Matthews, III et al. |
| 2013/0321178 | A1 | 12/2013 | Jameel et al. |
| 2013/0332007 | A1* | 12/2013 | Louboutin ............ H04W 4/021 701/2 |
| 2014/0107886 | A1 | 4/2014 | Miljkovic et al. |
| 2014/0129113 | A1 | 5/2014 | Van Wiemeersch et al. |
| 2014/0156111 | A1 | 6/2014 | Ehrman |
| 2014/0274013 | A1* | 9/2014 | Santavicca ............ H04W 4/008 455/418 |
| 2014/0293753 | A1 | 10/2014 | Pearson |
| 2015/0048927 | A1 | 2/2015 | Simmons |
| 2015/0084739 | A1 | 3/2015 | Lemoult et al. |
| 2015/0148989 | A1 | 5/2015 | Cooper et al. |
| 2015/0149042 | A1 | 5/2015 | Cooper et al. |
| 2015/0161832 | A1 | 6/2015 | Esselink et al. |

FOREIGN PATENT DOCUMENTS

| | | |
|---|---|---|
| WO | 0123695 A1 | 4/2001 |
| WO | 2014146186 A1 | 9/2014 |

OTHER PUBLICATIONS

Keyfree Technologies, Inc., "Keyfree, Carry less. Access more." web page, Jan. 10, 2014, 2 pages.
Keyfree Technologies, Inc., "Intelligent Lock/Unlock," web page, Jan. 16, 2014, 2 pages.
Hyundai Bluelink, "Send Directions to your car," Link to App, 2015, 3 pages.
Bryan Laviolette, "GM's New App Turns Smartphones into Virtual Keys," Article, Jul. 22, 2010, 2 pages.
Tesla Motors, "Tesla Model S," App, 2015, 2 pages.
Office Action dated Mar. 10, 2017, U.S. Appl. No. 15/174,206, Filed Jun. 6, 2016, 17 pages.

* cited by examiner

KEYLESS VEHICLE SYSTEMS

FIELD OF THE INVENTION

The present invention generally relates to door locks for motor vehicles, and more particularly to an entirely keyless vehicle door lock and ignition system that can be actuated utilizing a cell phone or the like to thereby eliminate the need for conventional keys.

BACKGROUND OF THE INVENTION

Doors of motor vehicles typically include a door latch that selectively retains the door in a closed position. The latch may include a door lock system having a lock cylinder that is accessible from the exterior of the vehicle door. The door may also include a powered door lock that can be actuated utilizing an interior switch or a remote wireless fob. If the wireless remote fob malfunctions, a user can typically still gain access by inserting a key into the lock cylinder to mechanically unlock the driver's door lock. However, the use of mechanical lock cylinders, keys, and linkages tends to add to the complexity and cost of the vehicle.

Existing motor vehicles may also include a passive entry-passive start (PEPS) system. Known PEPS systems may include a wireless fob that communicates with the vehicle. As a user approaches a vehicle and grasps a door handle, a capacitive sensor in the door handle generates a signal that unlocks the door if the vehicle detects an authorized fob in the vicinity of the vehicle. A user can then enter the vehicle and push a button to actuate the vehicle ignition system. The vehicle will start the engine if the vehicle detects the presence of an authorized fob. Vehicles having this type of a PEPS system typically include a lock cylinder that permits a user to enter the vehicle in the event the fob malfunctions.

SUMMARY OF THE INVENTION

One aspect of the present invention is a keyless entry and keyless ignition system for vehicles. The system includes a vehicle latch having an electronically powered lock, and an exterior vehicle handle having a sensor (e.g. capacitive sensor) that is configured to detect the presence of a user's hand adjacent the handle. The vehicle handle and latch may comprise a door latch and door handle, or may comprise a trunk, rear hatch, or hood latch. Also, the handle may comprise a separate, movable handle, or it may comprise an integral part of the vehicle door, vehicle rear hatch, rear deck lid, or hood. The vehicle includes a keyless vehicle ignition system including a push button or other user input feature. The vehicle ignition system may comprise an ignition system of the type utilized for internal combustion engines, or the vehicle ignition system may be configured to start an electric or hybrid vehicle. The system may include a main electrical power supply that is operably connected to the electrically powered lock, and a backup electrical power supply that is configured to provide electrical power to actuate and unlock the electrically powered lock in the event the main electrical power supply fails. The system further includes an exterior keypad or other suitable input device that is configured to permit manual entry of a security code by a user. The exterior keypad may be positioned on, for example, an exterior surface of a vehicle door. The system further includes a vehicle control and communication system including a Global Positioning (GPS) system. The vehicle control and communication system further includes first and second wireless transmitters and receivers. The first transmitter and the first receiver are configured to transmit and receive short range wireless signals (e.g. Bluetooth, RF, or NFC signals) to and from, respectively, a wireless device such as a smartphone. The second transmitter and second receiver are configured to transmit and receive cellular wireless signals to a cellular phone network. The cellular wireless signals may comprise, for example, wireless signals in the 824-896 MHz (800 MHz band) and/or 1850-1990 MHz (1900 MHz band) ranges. However, the cellular wireless signals may comprise other frequencies as may be required for a particular geographic area. The cellular wireless signals may utilize various technology/modes as required to provide wireless communication with various smartphones or other portable wireless devices. The vehicle control and communication system is configured to provide a dormant mode in which short range wireless signals are not sent or received by the first transmitter and first receiver, respectively. The vehicle control and communication system is also configured to provide an awake mode in which the first transmitter and first receiver transmit and receive, respectively, short range wireless signals. The vehicle control and communication system is configured to transmit and/or receive cellular wireless signals including GPS location data utilizing the second transmitter when the control and communication system is in the dormant mode. The control and communication system is configured to switch to the active mode and send a short range wireless verification signal request utilizing the first transmitter if a cellular wireless wake up signal is received by the second receiver. The control and communication system is also configured to unlock the electrically powered latch if an authorized wireless identification signal is received from an authorized wireless mobile cellular device and if the capacitive sensor detects a user's hand engaging the exterior vehicle handle. The control and communication system is configured to activate the keyless vehicle ignition system upon receiving a signal from the user input feature if an authorized wireless identification signal is received from an authorized wireless mobile cellular device. The control and communication system also causes the vehicle latch to unlock utilizing electric power from either the main electrical power supply or the backup electrical power supply if an authorized security code is input using the exterior keypad.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
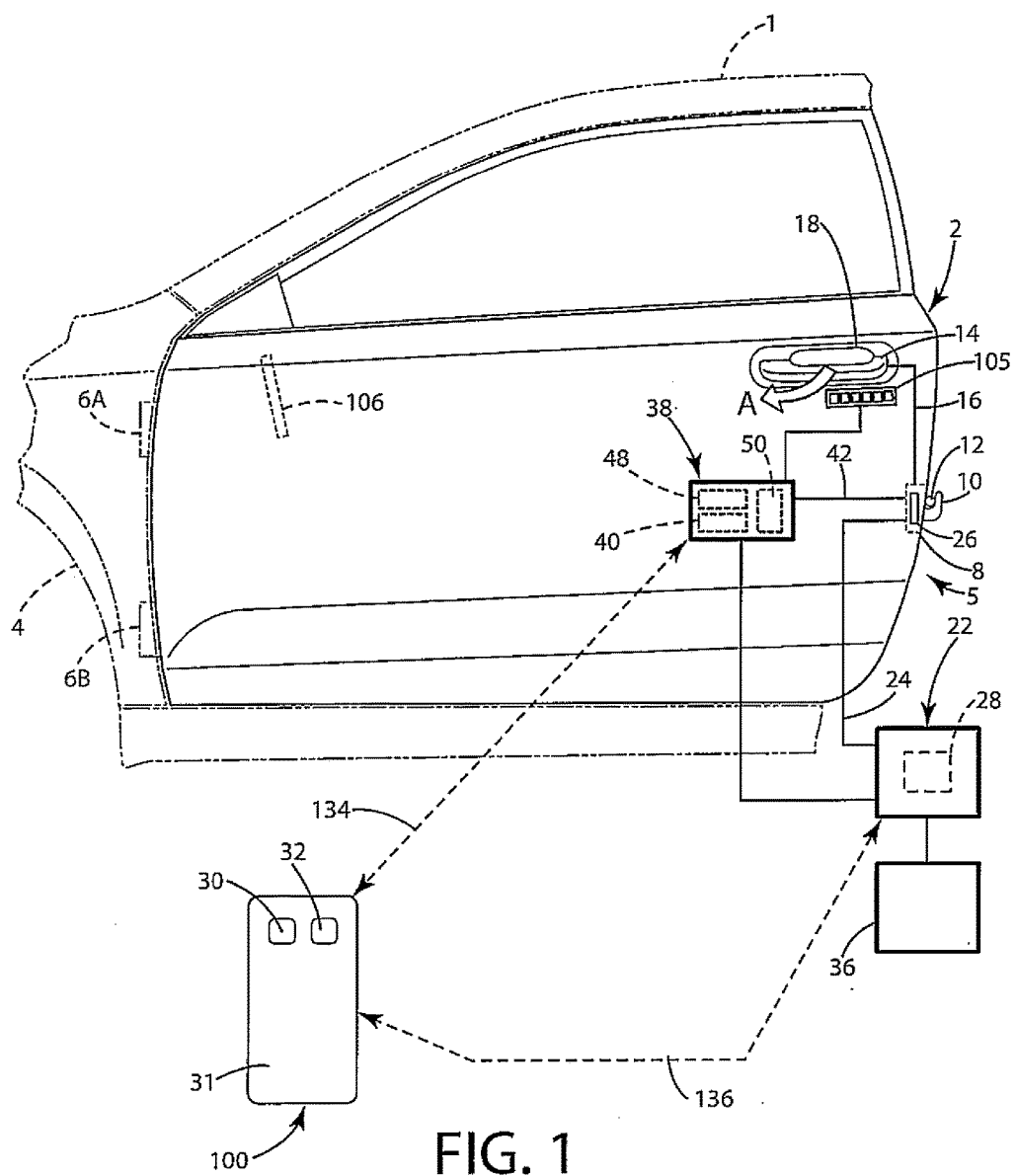
FIG. 1 is a partially schematic side elevational view of a vehicle door including a latch and powered lock system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 14/468,634, filed on Aug. 26, 2014, entitled "KEYLESS VEHICLE DOOR LATCH SYSTEM WITH POWERED BACKUP UNLOCK FEATURE." The present application is also related to U.S. Pat. No. 9,518,408, issued on Dec. 13, 2016, and entitled "ALTERNATE BACKUP ENTRY FOR VEHICLES." The entire contents of each of these applications is incorporated herein by reference.

FIGS. 1-7 generally describe a vehicle entry system that utilizes a powered lock arrangement and backup power supply to permit entry in the event the main power supply fails. The system also includes a keypad 105 (FIG. 1) that permits a user to enter a security code to unlock the vehicle door 2 in the event the batteries of cell phone 100 are dead, or if cell phone 100 is unavailable. As discussed in more detail below, the system of FIGS. 8-16 includes a smartphone-based PEPS system that permits vehicle entry and operation utilizing only a smartphone, thereby completely eliminating the need for a conventional fob and conventional key.

With reference to FIG. 1, a motor vehicle 1 includes a driver's side door 2 that does not have a lock cylinder of the type that receives a key to mechanically unlock the door 2. Door 2 is movably mounted to a vehicle structure 4 by hinges 6A and 6B. A latch system 5 includes a latch 8 that includes a movable latch member 10 that selectively engages a striker 12 to retain the door 2 in a closed position. Latch 8 also includes a powered lock 26. The latch 8 may be operably connected to a movable exterior door handle 14 by mechanical linkage 16. The linkage 16 may comprise elongated link members, a cable, or other suitable mechanical connection. If the powered lock 26 of door 2 is in an unlocked state, a user can move the handle 14 as indicated by the arrow "A" to thereby cause the latch 8 to unlatch, permitting the door 2 to be opened. Specifically, latch 8 may include a pawl (not shown) of a known configuration that selectively retains the latch member 10 in a latched position. When the latch 8 of door 2 is unlocked, movement of the handle 14 causes the pawl to shift to a released position, thereby allowing movement of latch member 10 whereby the latch member 10 disengages from striker 12 as door 2 is pulled open. However, if the powered lock 26 of latch 8 is in a locked state, movement of the handle 14 does not release the pawl, such that the movable latch member 10 remains in an engaged position relative to striker 12, thereby preventing opening of the door 2. The basic operation of latch 8 and powered lock 26 as just described is well known to those skilled in the art, such that a more detailed description concerning the operation of the pawl, latch member 10, striker 12, and powered lock 26 is not believed to be required.

The keyless latch system of FIGS. 1-7 includes a control module 22 that is operably connected to the latch 8 by a conductive line 24 or the like. Control Module 22 may comprise a main control module of motor vehicle 1, or it may comprise a "dedicated" door latch/lock control module. Lock 26 may comprise an electrically powered lock that is operably connected to the control module 22. The powered lock 26 is operably connected to a main vehicle power supply such as a battery 36. A mobile wireless device such as a cell phone ("smartphone") 100 may include software (an "App") that provides an input feature such as an icon 30 on touchscreen 31 of cell phone 100. Pushing/contacting icon 30 causes cell phone 100 to generate wireless signal 136 that is received by receiver 28 of control module 22, and the control module 22 then causes powered lock 26 to receive power from main (first) vehicle battery 36 to unlock the latch 8.

Driver's door 2 includes a backup module 38 that optionally includes a second receiver 40 that is configured to receive a second wireless signal 134 that is generated by the cell phone 100 upon actuation of an optical second input feature such as icon 32. The backup module 38 includes a controller or circuit arrangement 50 that causes electrical power from a backup (second) power supply 48 to be supplied to powered lock 26 through an electrical line 42 when second wireless signal 134 is received by second receiver 40. Alternatively, the latch system 5 may be configured such that backup module 38 does not include a receiver 40. In this case, control module 22 is configured to utilize power from backup power supply 48 to actuate/unlock lock 26 if controller 22 receives a signal 134 and if main power supply 36 has failed.

As discussed in more detail below, the system of FIGS. 1-7 may also be configured to unlock powered lock 26 utilizing power from backup power supply 48 if an authorized code (combination) is entered using an input feature such as keypad 105. The backup (second) power supply 48 may comprise a battery, capacitor, or other suitable power supply. As discussed in more detail below, backup (second) power supply 48 provides for unlocking of powered lock 26 even if main (first) power supply 36 fails. Furthermore, the backup power supply 48 may be operably connected to control module 22 and/or main vehicle battery 36 to recharge backup power supply 48 if required.

Figure 2:
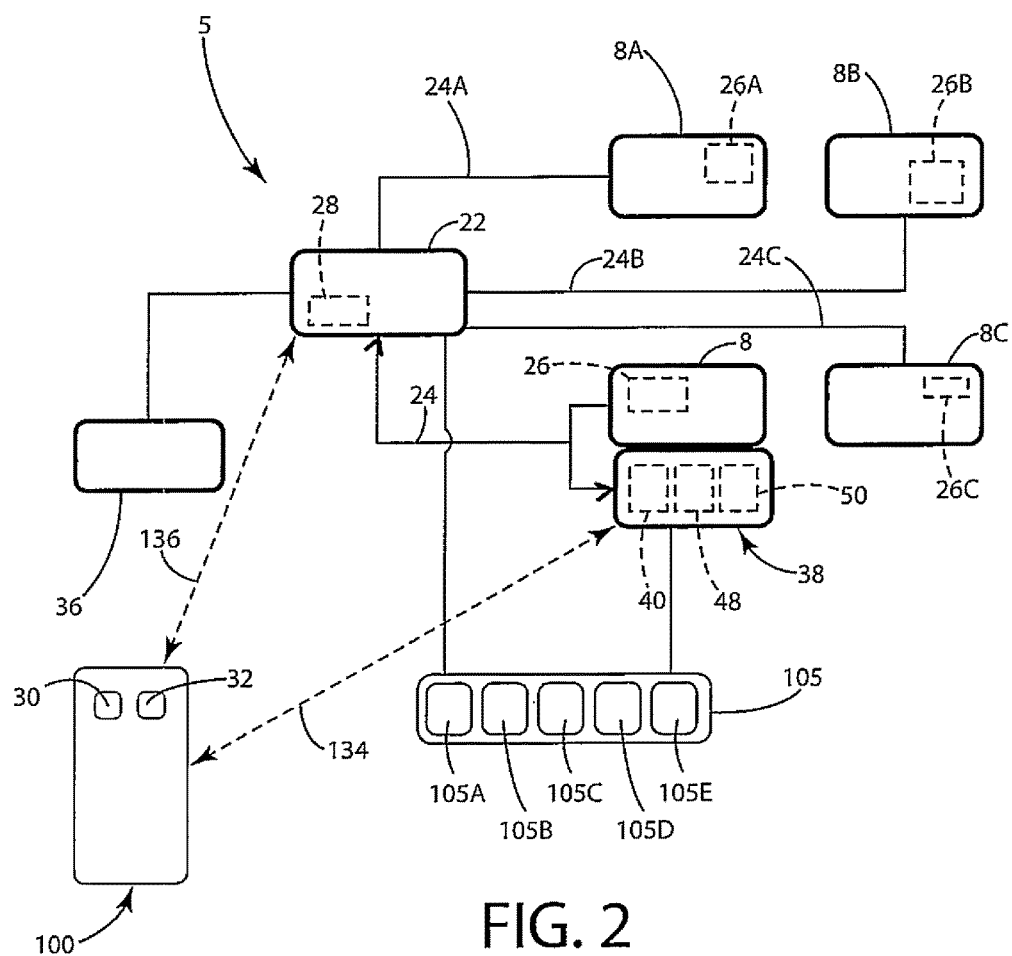
FIG. 2 is a schematic drawing of a latch and powered lock system according to one aspect of the present invention.

With further reference to FIG. 2, control module 22 may also be connected to right hand front latch 8A by a line 24A. Similarly, the control module 22 may be connected to a right rear latch 8B by a line 24B, and a left rear latch 8C by a line 24C. One or more interior switches (not shown) may be operably connected to the control module 22 whereby occupants of the vehicle can actuate the switches, thereby causing the control module 22 to supply power from battery 36 to the powered locks 26, 26A, 26B, and 26C of door latches 8, 8A, 8B, and 8C, respectively, in a manner that is generally known in the art.

Figure 3:
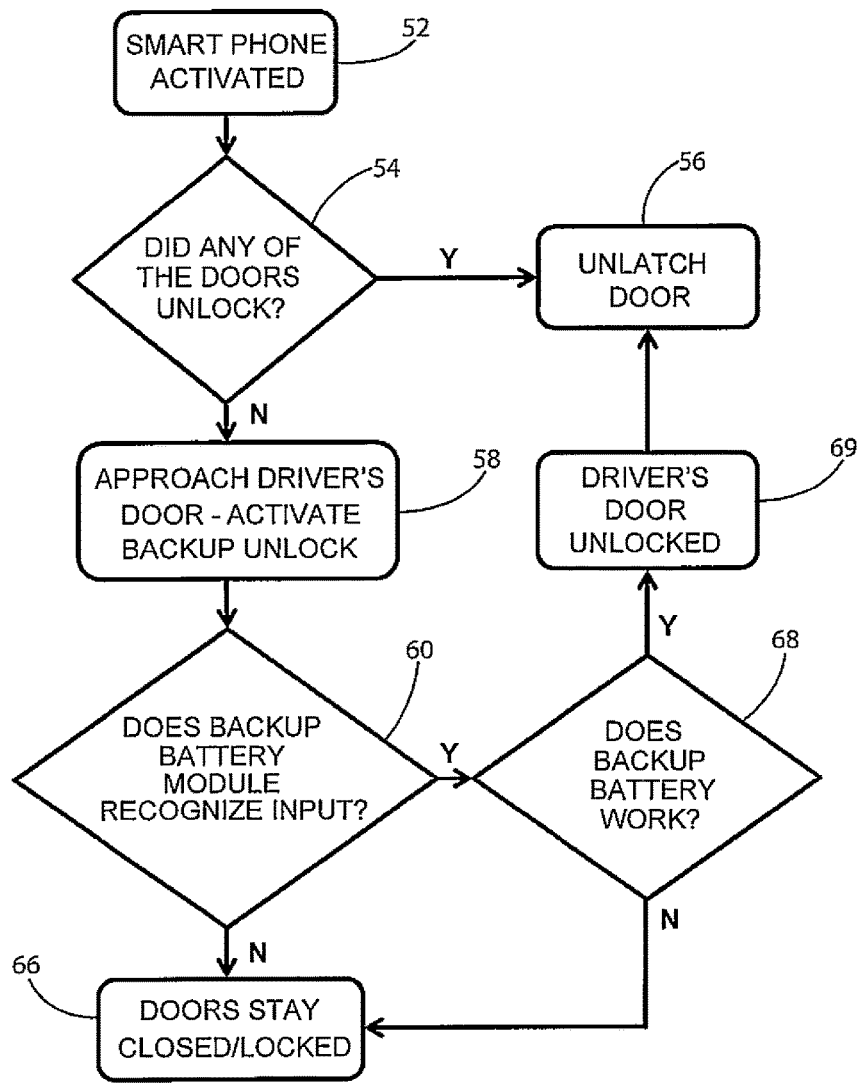
FIG. 3 is a flow chart showing operation of a door latch and powered lock according to one aspect of the present invention.

With further reference to FIG. 3, during operation the cell/smartphone 100 may be actuated as indicated by the step 52 to generate a wireless "unlock" command. In step 52, the first input feature/icon 30 (FIGS. 1 and 2) may be actuated to generate a first wireless signal 136 to the control module 22. At step 54, control module 22 determines if any of the locks 26-26C of latches 8-8C of the doors of the vehicle unlocked. If any of the doors did unlock, a user moves handle 14 and unlatches the door at step 56. If none of the doors unlock, a user may then actuate the second input 32 to activate the backup module 38 as shown at step 58. Alternatively, at step 58, a user may input a security code utilizing keypad 105 to thereby unlock the door.

Referring again to FIG. 3, backup module 38 determines if second wireless signal 134 or the keypad entry is recognized. If the backup module 38 does not recognize the second signal 134 or the keypad entry, the powered lock 26 remains locked as shown at step 66. If the second wireless signal 134 or keypad entry is recognized by the backup module 38 at step 60, and if the backup power supply 48 has sufficient power (step 68), the backup module 38 supplies power from backup power supply 48 to the powered lock 26 to thereby unlock the driver's door at step 69. This allows a user to unlatch the door at step 56 by grasping and pulling on handle 14.

Figure 4:
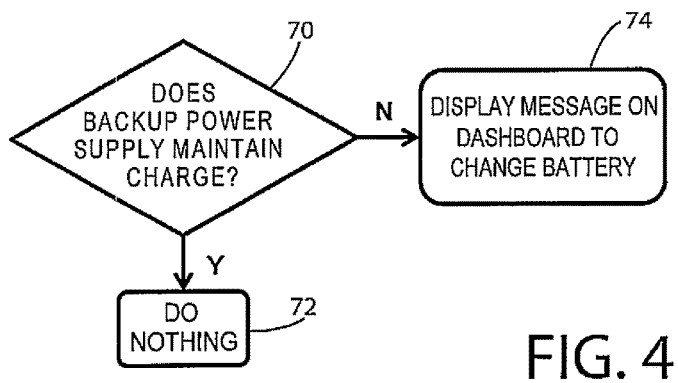
FIG. 4 is a flow chart showing battery recharge of the door lock system according to another aspect of the present invention.

With further reference to FIG. 4, the latch system 5 may be configured to recharge the backup power supply 48 if required. The control module 22 and/or backup module 38 may be configured to monitor the rechargeable backup power supply 48 as shown at step 70 of FIG. 4. If the backup power supply 48 does maintain a proper charge according to predefined criteria, the control module 22 and/or backup module 38 do not take any action as shown at step 72. In the event the backup power supply 48 does not maintain a proper charge at step 70, control module 22 and/or backup module 38 cause a message to be displayed on the vehicle dashboard indicating that the battery or backup power supply 48 must be changed/serviced as shown at step 74.

Figure 5:
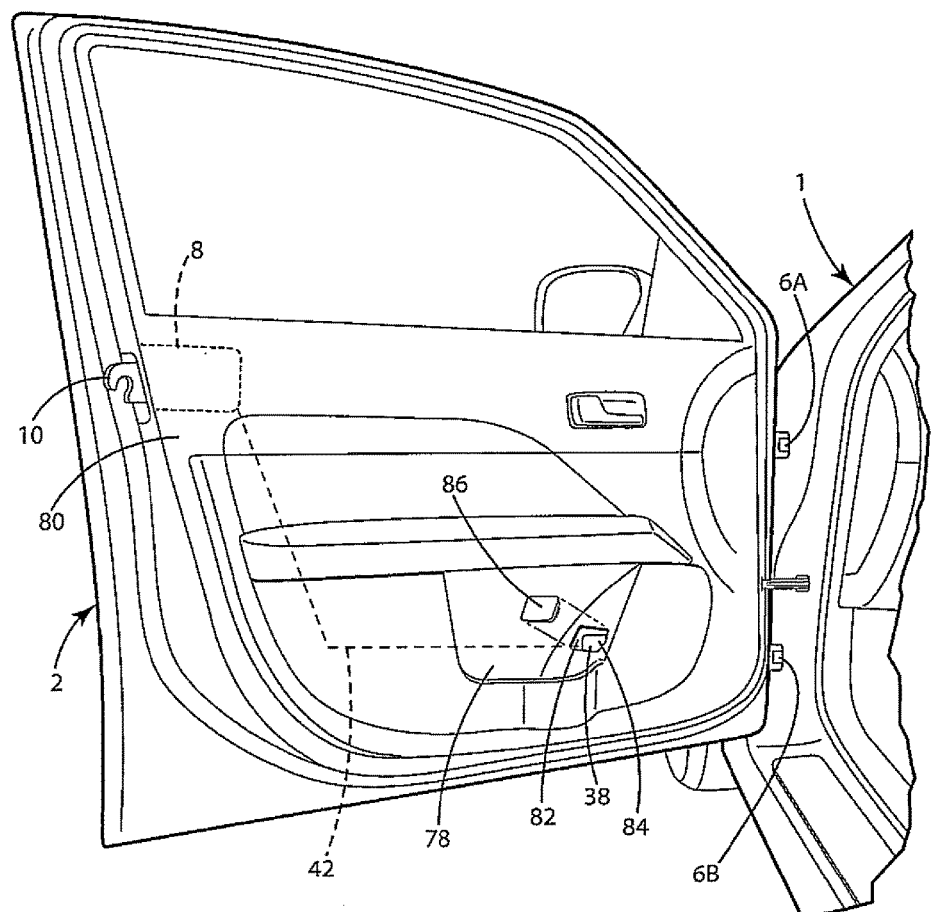
FIG. 5 is a partially fragmentary perspective view showing an interior of a vehicle door.

With further reference to FIG. 5, vehicle door 2 may include a map pocket 78 on an inner side 80 of door 2. The backup module 38 may be mounted in a cavity 82 that is accessible through an opening 84 in map pocket 78. A cover 86 may be removably attached to the door 2 to selectively close off opening 84. The opening 84 provides access to the backup module 38 to permit servicing and/or replacement of backup module 38, and to permit replacement of backup power supply 48 of backup module 38 as may be required. It will be understood that the arrangement of FIG. 5 is merely an example of a suitable location and mounting arrangement for the backup module 38. Alternatively, the backup module 38 may be mounted in an interior space of door 2 adjacent the exterior handle 14 (FIG. 1), whereby the backup module 38 is accessible by removing an exterior bezel 18 (FIG. 1).

Significantly, the latch system 5 eliminates the cost and complexity associated with conventional door lock cylinders and keys. Conventional door lock cylinders may take up significant space within vehicle doors, and the lock cylinder and associated linkage may need to be specifically designed for a particular vehicle door. In contrast, the backup module 38 may comprise a compact unit that can be mounted at numerous locations within the vehicle door 2. Because the backup module 38 can be operably connected to the latch 8 by an electrical line 42, specially designed mechanical linkage for a lock cylinder is not required in the latch system 5 of the present invention.

Referring again to FIGS. 1 and 2, it will be understood that the mobile/cell phone 100 may comprise a "smartphone," tablet, portable computer, or other wireless communication device. Mobile phone 100 is typically configured to utilize digital wireless cellular communication (e.g. 800 and/or 1900 MHz) and short range wireless technologies such as WiFi, BLUETOOTH®, etc. The mobile phone 100 communicates with receiver 28 and/or receiver 40 of control modules 22 and 38, respectively. The wireless signals 134 and 136 may comprise one way signals that are transmitted from mobile phone 100 to the receivers 28 and 40. Alternatively, the receivers 28 and 40 may comprise transceivers and the wireless signals 134 and 136 may comprise two way signals that permit two way communications between mobile phone 100 and receivers 28 and 40. In the illustrated example, the control modules 22 and 38 each have a separate receiver. However, it will be understood that a single receiver 28 may be operably connected to control module 22 and control module 38. It will be understood that receiver 28 could be integrated with module 22, or it may be mounted in a separate location and be operably connected to module 22 and/or module 38 utilizing conductive lines.

Mobile phone 100 may include a touchscreen 31 and software (an "App") that permits a user to cause the mobile phone 100 to generate a wireless unlock command signal. The unlock signal may comprise a unique security code, and the control modules 22 and/or 38 may be configured to unlock the door 2 only if an authorized unlock signal is recognized. Upon receiving an unlock signal from mobile phone 100, the controller 22 or controller 38 causes the powered lock 26 to unlock utilizing power from the main vehicle battery 36 or from backup power supply 48. The latch system 5 may be configured to utilize the main vehicle battery 36 to unlock the powered lock 26 if the main battery 36 is functioning properly. In the event the main power supply 36 is not functioning properly, the latch system 5 may be configured to utilize the backup (second) power supply 48.

As shown in FIGS. 1 and 2, the powered latch system 5 may also include a user authentication device such as a keypad 105. The keypad 105 may include a plurality of discreet inputs such as pads or buttons 105A-105E. Alternatively, keypad 105 may comprise a touch screen or other suitable device having one or more inputs that provide for entry of a security code. Keypad 105 could also comprise a biometric device such as a fingerprint reader, retina I.D. device or the like. The controllers 22 and/or 38 may be configured to actuate the powered lock 26 to unlock the latch system 5 if an authentication signal such as a specific sequence/combination of inputs is input utilizing the pads/buttons 105A-105E of keypad 105. The latch system 5 may be configured to permit a user to provide a unique security sequence or code ("PIN") that must be entered utilizing the keypad 105.

In the event the mobile phone 100 is inoperable due to the batteries of the mobile phone 100 being dead and/or other malfunction of mobile phone 100, a user can use keypad 105 to actuate the powered lock 26 to unlock the latch system 5.

Figure 6:
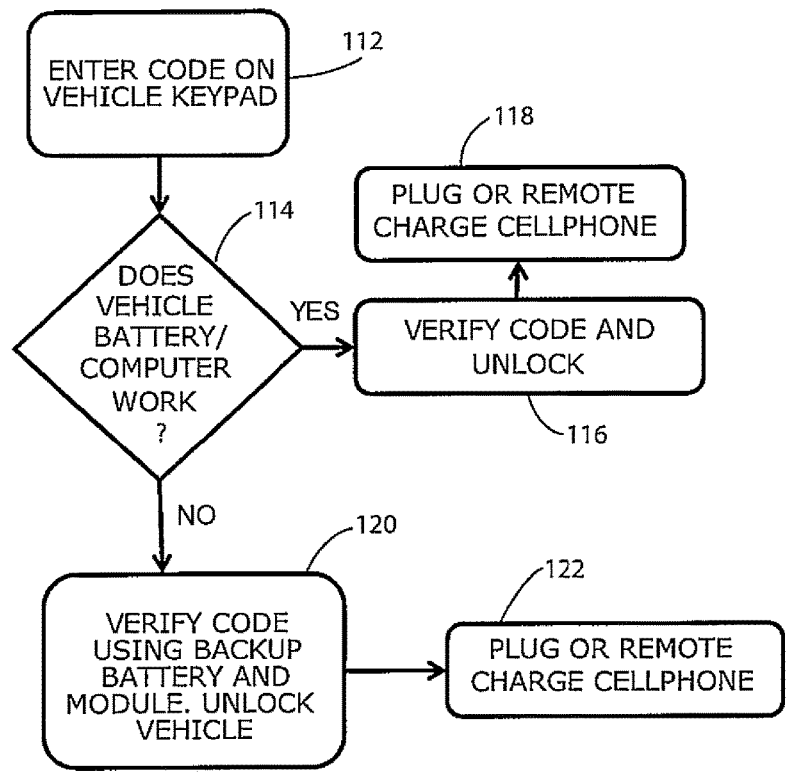
FIG. 6 is a flowchart showing operation of the vehicle keypad.

Operation of the keypad 105 is shown in FIG. 6. Keypad 105 may be utilized if the batteries of cell phone 100 are dead, or if cell phone 100 is not functioning properly. Specifically, at step 112, a user enters a code utilizing keypad 105. At step 114 the system determines if the main vehicle power supply 36 and/or main control module 22 are operational. If "yes," at step 116 the system 5 (e.g. control module 22) verifies the code and causes the powered lock 26 to unlock utilizing power 36. A user can then plug or remote charge the cell phone as shown at step 118. Referring back to step 114, if the main vehicle power supply 36 and/or main control module 22 are not operational, at step 120 the backup module 38 verifies the code input utilizing keypad 105, and the powered lock 6 is unlocked utilizing power from the backup power supply 48. In general, the controller 50 of backup module 38 may be operated utilizing power from the backup power supply 48 in the event the main power supply 36 fails or is disconnected from the backup module 38. After the vehicle is unlocked, a user can plug or remote charge the cell phone 105 as shown at step 122 (e.g. charge the cell phone by connecting a charger to the vehicle's electrical system).

Figure 7:
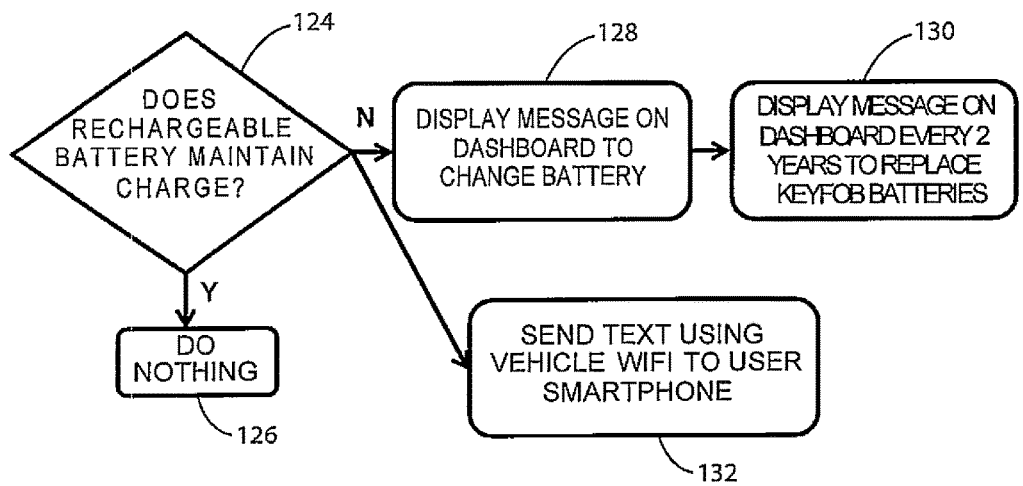
FIG. 7 is a flowchart showing a feedback loop that is utilized to monitor the health of the backup rechargeable battery.

With further reference to FIG. 7, the latch system 5 may be configured to monitor the status of the main vehicle battery 36 and alert a user if the main vehicle battery 36 is malfunctioning. Specifically, at step 124 the main control module 22 and/or backup module 38 determine if the main vehicle battery 36 is maintaining a charge. If the main vehicle battery 36 is properly maintaining a charge according to predefined criteria, the system does nothing as shown at step 126. However, if the main vehicle battery 36 does not maintain a proper charge, an alert such as a text message can be sent to the user's mobile phone 100 utilizing the Wi-Fi of the vehicle 1 and/or the receivers 28 and 40 at step 132 (if the receivers 28 and 40 are configured to both transmit and receive wireless signals). Also, at shown at step 128, the system may be configured to display a message on a display screen 106 (FIG. 1) located inside the vehicle 1 in the event the main vehicle battery 36 does not maintain a proper charge. The message may be displayed on the dashboard continuously, or at predefined time intervals. As shown at step 130, the system may also be configured to display a message on the display screen 106 periodically (e.g. once a month, once a year or once every 2 years) to replace the batteries in a keyfob if the system includes a keyfob (not shown). It will be understood that the main vehicle battery 36 may be monitored utilizing the steps shown in FIG. 7 at periodic intervals (e.g. every 60 seconds, once every hour, once every 24 hours, etc.).

In addition to the unlock functions discussed above, the vehicle 1 may also be configured to permit operation of the vehicle 1 based on a signal received from mobile phone 100 and/or entry of an authorized code utilizing an authentication feature or device such as keypad 105. For example, vehicle 1 may be configured to include a keyless ignition whereby the vehicle can be operated if an authorized signal is received from a fob. If a user does not have a fob, or if the fob malfunctions, the user can unlock the powered lock 26 utilizing the mobile phone 100 or by using the keypad 105. Also, upon entering the vehicle 1, the user can operate the vehicle utilizing an authorized signal from the mobile phone 100 and/or by entering an authorized code utilizing the keypad 105. It will be understood that the display 106 located inside the vehicle may comprise a touch screen device that permits entry of an authorization code whereby a user can enter a code utilizing the display screen 106 to permit operation of the vehicle.

Figure 8:
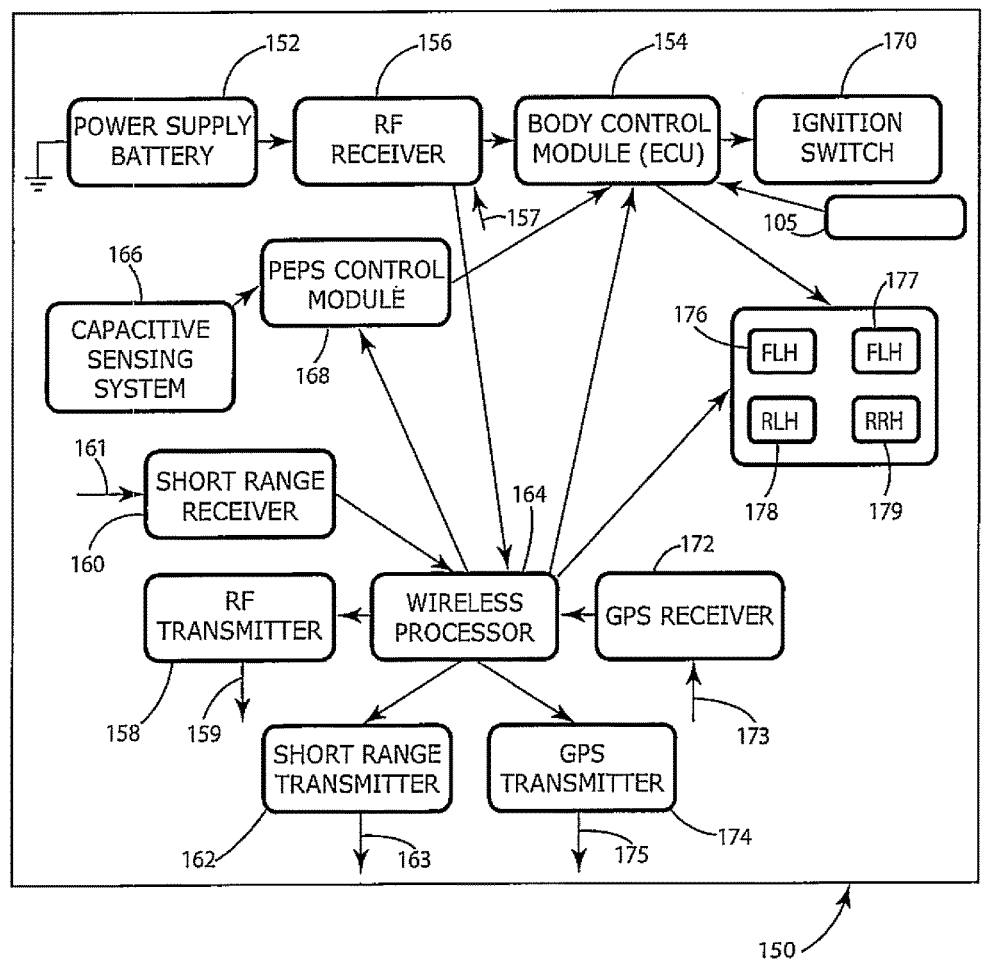
FIG. 8 is a block diagram of a keyless vehicle system according to another aspect of the present invention.

With further reference to FIG. 8, a keyless system 150 according to another aspect of the present invention includes a power supply 152 that may include a main battery 36 and backup power supply 48 as shown in FIG. 1. The system 150 also includes a body control module 154 that is similar to the control module 22 (FIG. 1). The system 150 also includes cellular receiver 156 and cellular transmitter 158. Cellular receiver 156 is configured to receive a cellular wireless signal 157. Cellular transmitter 158 is configured to transmit a wireless signal 159. The cellular receiver 156 and cellular transmitter 158 are configured to provide for communication utilizing cellular wireless signals. For example, the receiver 156 and transmitter 158 may be configured to communicate utilizing 824-896 MHz and/or 1850-1990 MHz wireless signals. These cellular bands are commonly referred to as 800 MHz and 1900 MHz frequencies, respectively. Accordingly, as used herein, the term 800 MHz generally refers to signals in the 824-896 MHz band, and the term 1900 MHz generally refers to signals in the 1850-1990 MHz range. It will be understood that the cellular receiver 156 and cellular transmitter 158 may be configured to utilize various frequencies and modes as may be required for particular geographic areas.

System 150 also includes a short range wireless receiver 160 and a short range wireless transmitter 162. Transmitter 162 is configured to transmit a short range wireless signal 163. The short range receiver 160 and short range transmitter 162 may comprise Bluetooth® devices, or other wireless communication technologies that do not require communication via cell towers. The cellular receiver 156, cellular transmitter 158, short range receiver 160, and short range transmitter 162 are operably connected to a wireless processor 164. Short range receiver 160 is configured to receive a wireless signal 161. It will be understood that the wireless processor 164 and the wireless receivers and transmitters may be integrated into the body control module 154, or these components may comprise separate units.

The system 150 further includes a capacitive sensing system 166 that is operably connected to a PEPS control module 168. The PEPS control module 168 is operably connected to the body control module 154 and the wireless processor 164. The capacitive sensing system 166 may include one or more capacitive sensors that are positioned on an exterior vehicle door handle 18 (FIG. 1) or other location that is accessible by a user outside the vehicle. Capacitive sensing system 166 may also include capacitive sensors positioned on other vehicle components such as a vehicle rear hatch, rear deck lid, or vehicle hood. The system 150 further includes an ignition switch 170 that is operably connected to the body control module 154. The ignition switch 170 may comprise a push button or other suitable input feature or device that is mounted in a vehicle interior. As discussed in more detail below, in use the system 150 determines if an authorized cell/smart phone is present, and starts the vehicle when a vehicle pushes the ignition switch 170 if an authorized cell phone is detected. It will be understood that ignition switch 170 may be configured to start a conventional internal combustion engine, or it may be configured to start an electric or hybrid vehicle. Thus, as used herein, the term "ignition" is not necessarily limited to actual ignition of combustible material, but rather refers more generally to the ignition/start function in a motor vehicle.

The system 150 further includes a GPS receiver 172 and a GPS transmitter 174. GPS receiver 172 is configured to receive a wireless GPS signal 173. GPS transmitter 174 is configured to transmit a wireless GPS signal 175. As discussed in more detail below, the GPS system can be utilized to determine the positions of a vehicle 1 and a user's cell phone to thereby control operation of system 150. The body control module 154 and wireless processor 164 are also operably connected to front left latch/handle 176, front right latch/handle 177, rear left latch/handle 178, and right rear latch/handle 179.

Figure 9:
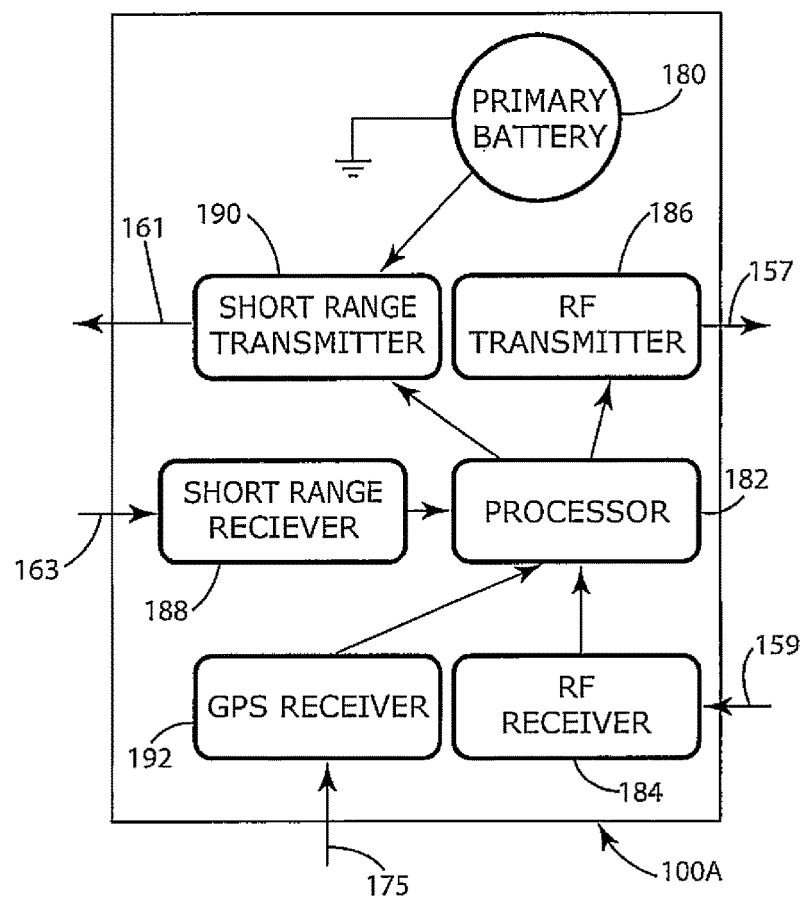
FIG. 9 is a block diagram of a portable wireless device such as a smartphone.

With further reference to FIG. 9, a cell/smart phone 100A includes a battery 180 that is operably connected to a processor 182, a cellular receiver 184, a cellular transmitter 186, a short range (e.g. Bluetooth®) receiver 188, a short range (e.g. Bluetooth®) transmitter 190, and a GPS receiver 192. Cellular transmitter 186 is configured to transmit a cellular wireless signal 157. Cellular receiver 184 is configured to receive a wireless cellular signal 159. Short range transmitter 190 is configured to transmit a short range wireless signal 161 that does not require cell towers. Short range receiver 188 is configured to receive a wireless signal 163 that does not require cell towers. GPS receiver 192 is configured to receive a wireless GPS signal 175 that includes GPS data concerning the location of vehicle system 150. Short range receiver 188 and short range transmitter 190 may be configured to utilize various non-cellular technologies. Accordingly, the present invention is not limited to a Bluetooth®-based short range wireless arrangement. The cellular receiver 184 and cellular transmitter 186 are configured to communicate with the cellular receiver 156 and cellular transmitter 158 of the vehicle system 150 utilizing 800 and/or 1900 MHz wireless signals transmitted via cell towers in a known manner. Other frequency bands may also be utilized if the cellular infrastructure of a given geographic region utilizes other frequency bands.

Figure 10:
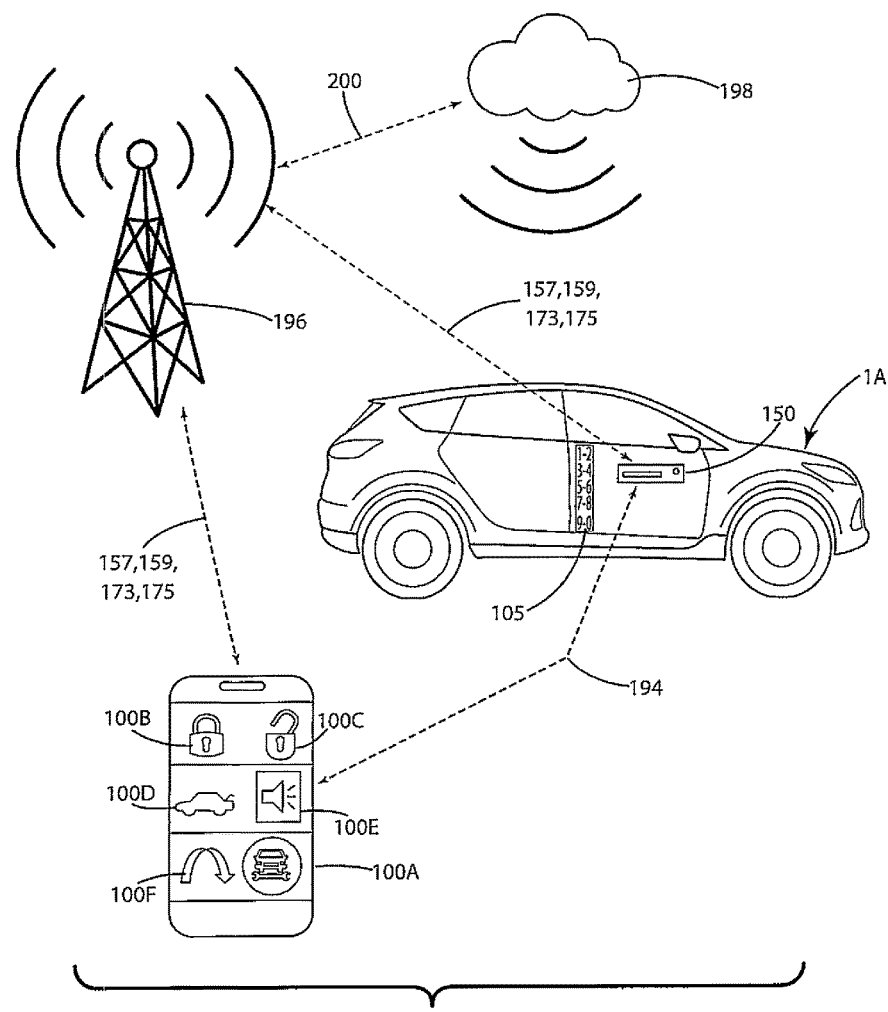
FIG. 10 is a schematic view of a keyless vehicle system showing smartphone "fob" functioning and PEPS operation if the cell phone is operating properly and if main and backup power supplies of the vehicle are functional.

With further reference to FIG. 10, smartphone 100A and keyless system 150 may be configured to provide remote key fob functions. Smartphone 100A includes programming (e.g. an "app") that causes smartphone 100A to display one or more icons 100B-100F corresponding to remote fob functions/operation such as door lock/unlock, deck/hatch lock/unlock, remote engine start, a "panic" function (sounding vehicle horn), etc. Vehicle 1A includes a keyless system 150 that is configured to communicate with smartphone 100A utilizing wireless signals 194. The wireless signals 194 of FIG. 10 may comprise wireless signals 157, 159, 161, 163, 173 and/or 175 as discussed above in connection with FIGS. 8-9. However, wireless signal 194 preferably comprises short range wireless signals 161 and 163 provided by a suitable short range wireless communication technology that does not require communication via a cellular network. The system 150 may also be configured to communicate with smartphone 100A via a cell tower 196 utilizing wireless cellular signals 157, 159, 173, and 175. The cellular signals may also communicate with a "cloud" 198 via a connection 200 to thereby provide an internet connection to the keyless vehicle system 150 and the smartphone 100A.

Figure 11:
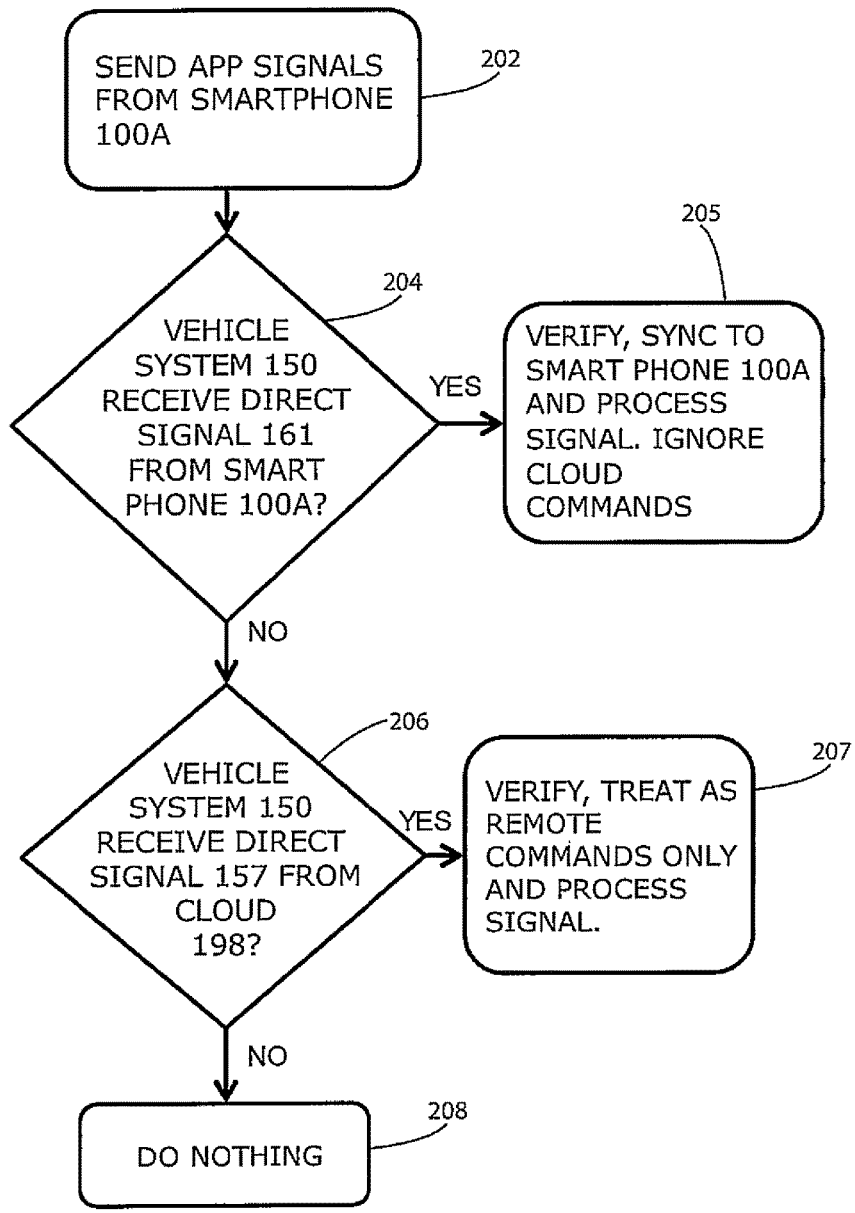
FIG. 11 is a block diagram showing operation of the system of FIG. 10.

With further reference to FIG. 11, when the smartphone 100A and keyless system 150 are operating to provide remote key fob functions, a first step 202 involves utilizing software (an "app" providing icons) on smartphone 100A to send a wireless signal. The wireless signal preferably comprises both a short range wireless signal 161 and a cellular signal 157. At step 204, if the vehicle system 150 receives a direct signal (e.g. wireless signal 161) from smartphone 100A, operation of the system proceeds to step 205. At step 205, system 150 verifies that the signal from smartphone 100A is an authorized signal, and syncs to smartphone 100A and processes the wireless signal. The wireless signal from cell phone 100A may comprise a door unlock signal, a vehicle start signal, a "panic" signal, a latch/hatch release signal, or other "fob" signal (i.e. a signal having a function that is the same or similar to functions provided by pushbuttons of conventional wireless fobs). The system 150 processes the "fob" signal and actuates the vehicle ignition to start the engine, or unlocks the door, or unlatches a vehicle hatch, or sounds the vehicle horn according to the type of "fob" signal received from smartphone 100A.

Referring again to step 204, if the vehicle system 150 does not receive a direct (i.e. short range) wireless signal 161 from smartphone 100A, the vehicle may receive a wireless cellular signal 157 from cloud 198. The app of smartphone 100A may be configured to cause smartphone 100A to initially transmit both short range wireless signals 160 and cellular signals 157, and the system 150 responds accordingly as shown in FIG. 11. Signal 157 and/or signal 161 may include an authorization code that is associated with a specific user and/or vehicle. If a cellular signal 157 is received at step 206, the operation continues as shown at step 207. At step 207, the keyless system 150 verifies that the signal 157 is from an authorized smartphone 100A, and processes the signal accordingly to provide the desired fob function (e.g. starting the vehicle, unlocking the doors, unlocking latch, sounding vehicle horn, etc.). If the system 150 does not receive a signal 157 at step 206, the system does nothing as shown at step 208.

Figure 12:
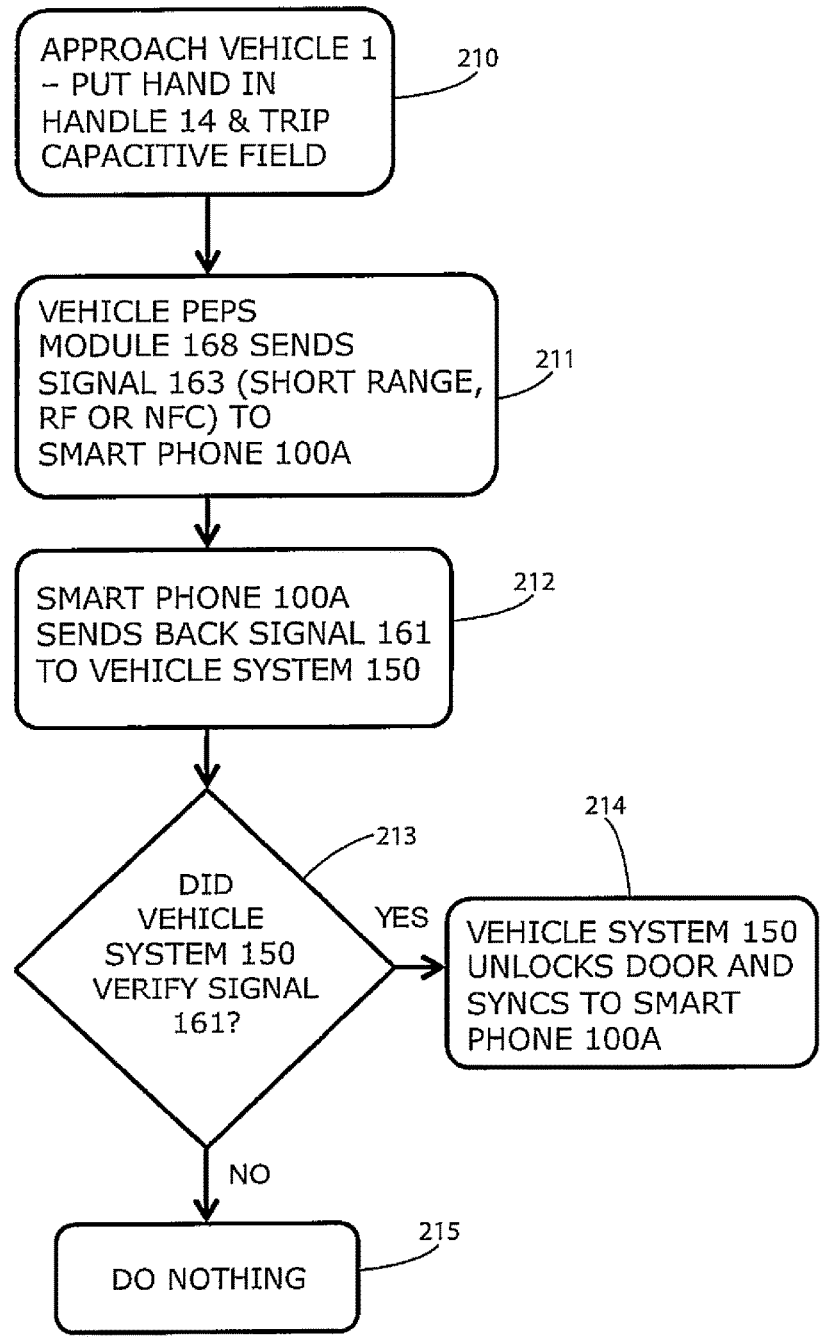
FIG. 12 is a flowchart showing operation of the system of FIG. 10.

System 150 may be configured to operate as shown in FIG. 12. Specifically, during PEPS operation of system 150 (see also FIG. 10), a user approaches the vehicle 1, puts his or her hand in or adjacent handle 14, thereby causing the capacitive sensing system 166 to generate a signal that is received by the control module 154 as shown at step 210 (FIG. 12). At step 211, the PEPS control module 168 sends a wireless signal 163 to the smartphone 100A. At step 212, the smartphone 100A sends a signal 161 back to the receiver 160 of vehicle system 150. As shown at step 213 if the vehicle system 150 verifies that the signal 161 is from an authorized smartphone 100A, operation continues as shown at step 214. At step 214 the vehicle system 150 actuates the power door locks and unlocks the vehicle, and also syncs to smartphone 100A to provide additional PEPS functions such as passive engine start. For example, if a user actuates the ignition switch 170 after the vehicle system 150 syncs to smartphone 100A as shown at step 214 (FIG. 12), the body control module will cause the vehicle engine to start. If the vehicle system 150 does not verify that an authorized signal has been received at step 213, the system does nothing as shown at step 215. An alternative version of the configuration/operation of the system is discussed in more detail below in connection with FIGS. 15 and 16.

Figure 13:
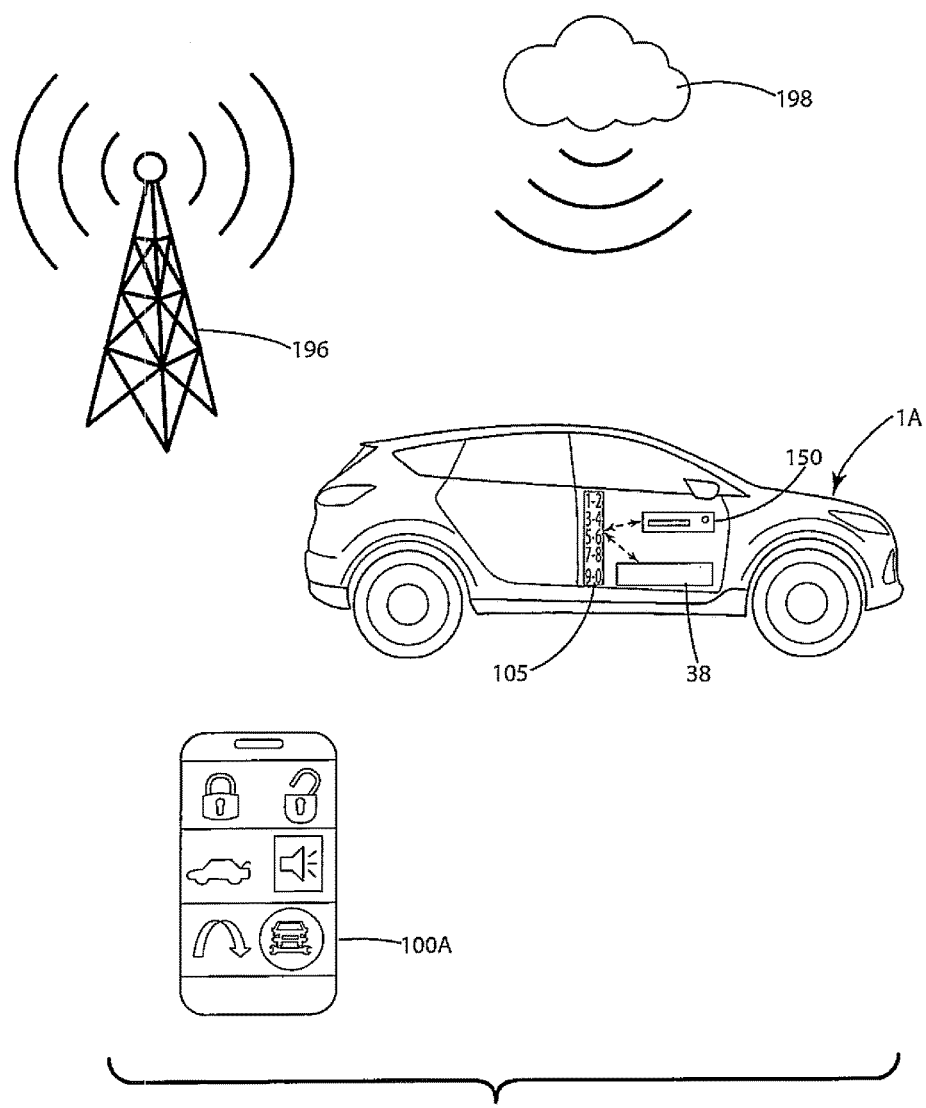
FIG. 13 is a schematic view of a system according to the present invention if the smartphone battery is dead.
Figure 14:
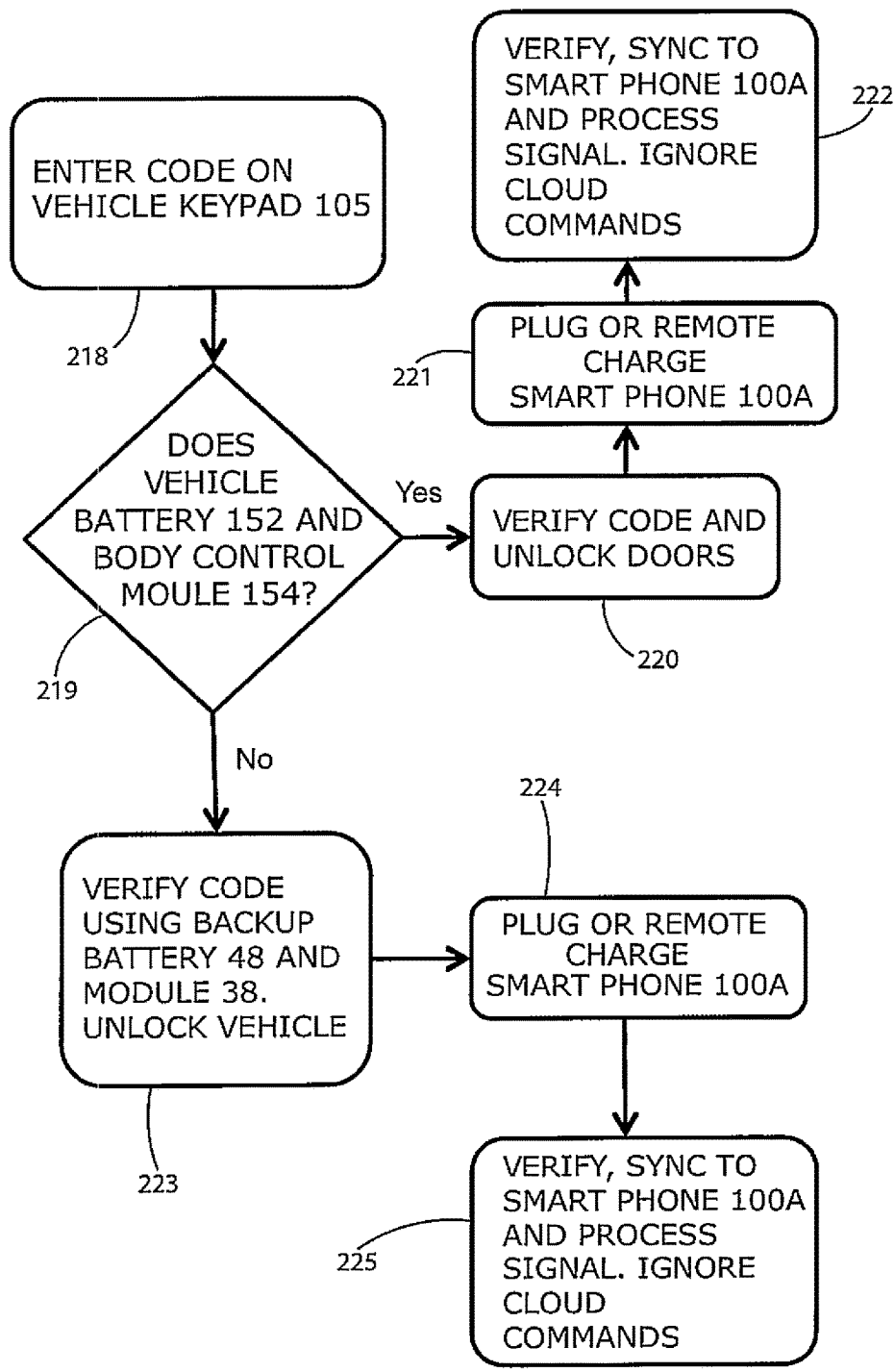
FIG. 14 is a flowchart showing operation of the system of FIG. 13.

With further reference to FIGS. 13 and 14, if the battery in smartphone 100A is dead, the smartphone 100A does not send or receive wireless signals. In this situation, a user enters an authorization code utilizing an input device such as vehicle keypad 105 as shown at step 218 (FIG. 14). If the vehicle battery 152 and body control module 154 are operating properly (step 219), the system proceeds to step 220 and verifies the code entered utilizing the keypad 105, and unlocks the doors if an authorized/verified code is detected. At step 221, a user recharges the smartphone 100A by, for example, connecting the smartphone 100A to the power supply 152. At step 222, after the smartphone 100A is charged sufficiently, the system 150 syncs to the smartphone 100A and processes the short range wireless signals 161 received from the smartphone 100A. It will be understood that the smartphone 100A may be operably connected to the system 150 after a user has entered the vehicle 1 by plugging in a line (wires) to communicate directly, such that wireless signals 161 are not required.

Referring again to FIG. 14, if the vehicle battery 152 and/or the body control module 154 are not operating properly at step 219, operation proceeds to step 223. At step 223, the system 150 verifies the code entered utilizing the keypad 105 utilizing electrical power from the backup battery 48 (FIG. 1) and the backup module 38. The system 150 then unlocks the vehicle doors utilizing power from the backup battery 48. At step 224, a user then charges the smartphone 100A. The smartphone 100A may be charged by operably connecting the smartphone 100A to the backup battery 48 by plugging in a "hard" line (wire) or the like. At step 225, the system 150 verifies the wireless signal from the smartphone 100A after it is sufficiently charged, and syncs to the smartphone 100A, and processes the signals. As shown at step 225, the system 150 then ignores cellular signals 157 that may be received from cloud 198. The step 225 may be performed utilizing power from the backup system 38 and backup power supply 48 if the main battery 152 has not been charged. Alternatively, if the main power supply 152 has been charged, step 225 can be performed by the body control module 154 and main power supply 152.

Figure 15:
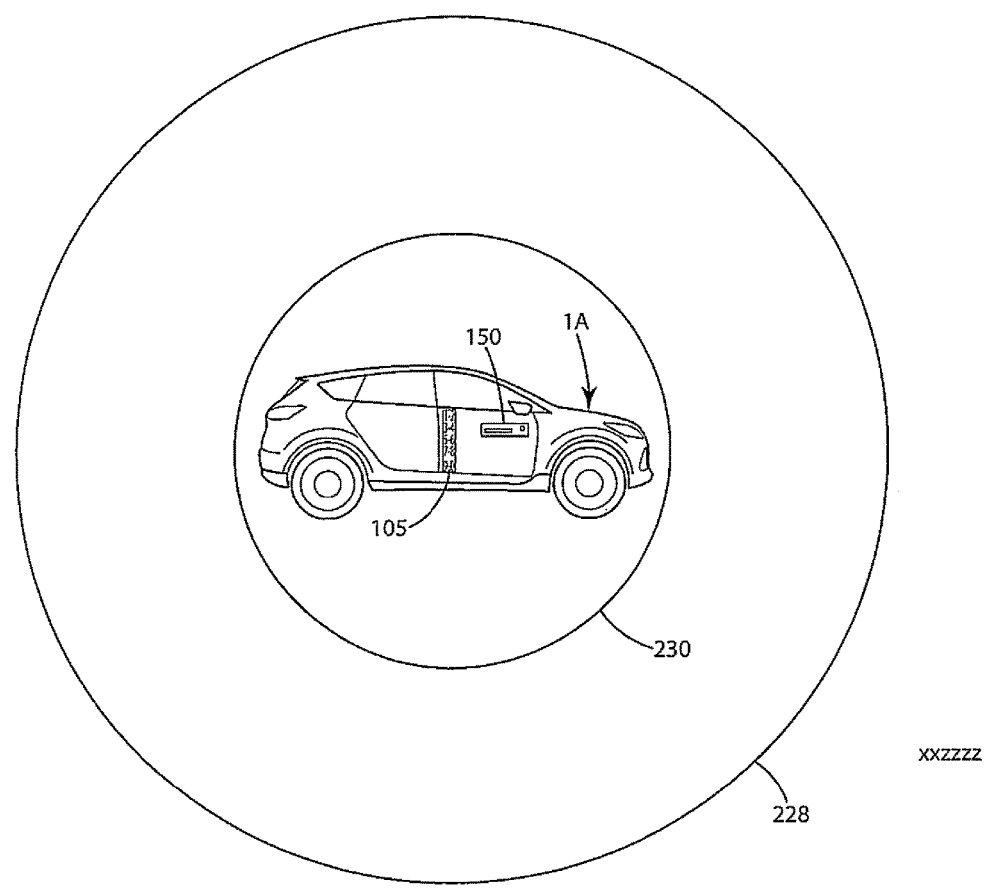
FIG. 15 is a schematic view showing a vehicle and a Bluetooth-module wake-up zone and a larger system wake-up zone.
Figure 16:
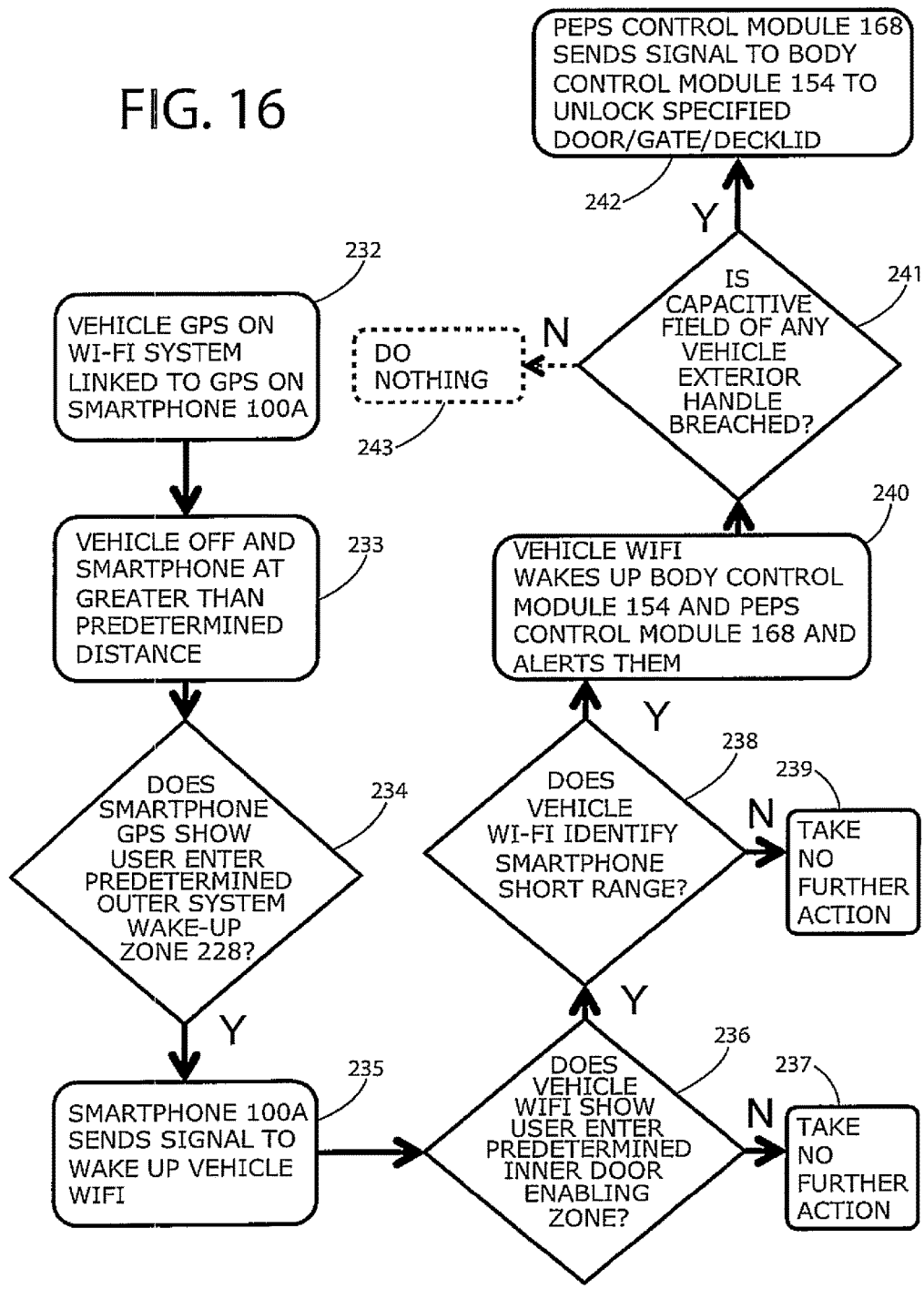
FIG. 16 is a flowchart showing operation of the system of FIG. 15.

With further reference to FIGS. 15 and 16, the system 150 may be configured to operate utilizing a first/outer wakeup zone 228, and a second/inner wakeup zone 230. The outer wakeup zone 228 may comprise a circle (or other area) having a radius of, for example, approximately 15-45 feet about the vehicle 1A. The inner wakeup zone 230 may comprise a circle (or other area) having a radius of, for example, approximately 5 feet from each door/latch of vehicle 1A. The radiuses of zones 228 and/or 230 may be selected/input by a user.

As discussed below, if smartphone 100A is moving towards the vehicle and the system is in the dormant mode, the smartphone 100A sends a signal to the vehicle system 150. This will cause the vehicle Wi-Fi (cellular) module to wake up if it is asleep. This in turn alerts the short range transmitter 162 to send "challenge signals" within the inner zone 230. This allows the Wi-Fi module (e.g. wireless processor 164, FIG. 8) to draw little or no current for longer periods of time to thereby conserve energy. Once the short range transmitter's challenge signal is authenticated by the smartphone 100A via a return short range wireless signal, the Wi-Fi module activates or wakes up (turns on) the PEPS module 168. This allows the PEPS module 168 not to draw current for longer periods of time to thereby conserve energy. The PEPS module 168 then waits for a signal from the capacitive sensors of system 166 on the exterior door handle 14 to be tripped in order to send an unlock signal to that particular door/liftgate. Inner zone 230 is preferably about 3-5 feet from each door/liftgate. Thus, it will be understood that vehicle 1A actually has a plurality of inner zones 230, one for each vehicle door and/or tailgate/hatch. Thus, the smartphone user closest to the driver door will not allow another person to open the passenger door first. Once the driver or any outer door is opened by the user, the vehicle can be programmed (e.g. by a user) to either only unlock that door or all doors.

At step 232 (FIG. 16) the vehicle GPS system is linked to the GPS system of smartphone 100A. Step 232 represents a condition in which smartphone 100A is initially outside of the outer wakeup zone 228. If the smartphone 100A is outside the outer zone 228 for a period of time, the keyless system 150 may be configured to continue to communicate with the smartphone 100A utilizing the (cellular) long range wireless communication system as shown at step 233. The keyless system 150 may be configured to go into a sleep or dormant mode to reduce electrical usage. System 150 goes into the dormant mode if, for example, an authorized smartphone 100A is not detected within a predefined range for a predefined period of time (e.g. 5 minutes, 15 minutes, 30 minutes, 1 hour, etc.). When in the dormant or sleep mode, the system 150 continues to receive and/or transmit wireless cellular signals from/to smartphone 100A. The wireless cellular signals may include GPS data concerning the location of the smartphone 100A. The system 150 may be configured to utilize GPS data from the vehicle's GPS system and GPS data from the cell phone to determine the location of the smartphone 100A relative to the vehicle. Alternatively, smartphone 100A may be configured/programmed to determine the relative location of the smartphone 100A relative to the vehicle. Specifically, smartphone 100A may store GPS data concerning the location of the vehicle 1A and/or receive updated GPS position data for the vehicle 1A (e.g. if vehicle 1A moves), and the smartphone 100A may compare the vehicle GPS position data to the GPS position data of the smartphone 100A. Thus, smartphone 100A can determine the distance between smartphone 100A and vehicle 1A and determine if smartphone 100A is within zones 228 and/or 230. Smartphone 100A may utilize the distance information to control/determine if long and/or short range wireless signals are utilized to communicate with receivers 156 and/or 160. Smartphone 100A may be configured (i.e. programmed) to store the last GPS position of the vehicle 1A in the smartphone memory. Smartphone 100A may also be configured to periodically send wireless cellular signals to vehicle 1A via a cellular system 196 and/or "cloud" 198. These periodic signals may be utilized to wake up the system 150 of vehicle 1A, and system 150 may send GPS position data to smartphone 100A. In this way, the GPS data concerning the location of vehicle 1A can be periodically updated in the memory of smartphone 100A. This enables smartphone 100A to keep track of the location of vehicle 1A in the event vehicle 1A is towed or otherwise moved when smartphone 100A is at a remote location.

As shown at step 234, if the smartphone 100A determines that the smartphone 100A is within the outer wakeup zone 228, the smartphone 100A sends a signal (e.g. a cellular wireless signal) to wake up the vehicle short range wireless communication system (receiver 160) as shown at step 235. As shown at step 236, if the system determines that a user has entered the inner door-enabling zone 230, operation proceeds to step 238. If the smartphone 100A has not entered the inner wakeup zone 230, the system does not take any further action as shown at step 237. At step 238, if the keyless system 150 receives an authorized wireless signal 161, operation proceeds to step 240. At step 238, if the system 150 does not receive an authorized wireless signal 161, no further action is taken as shown at step 239.

At step 240, if an authorized wireless signal 161 is received at step 238, the system 150 then wakes up the body control module 154 and PEPS control module 168, and alerts the modules that an authorized user (i.e. smartphone 100A) is within the inner wake up zone 230 (FIG. 15). At step 241, the system 150 determines if the capacitive field of any vehicle exterior handle has been breached (i.e. a user has grasped a vehicle handle). If a user has not grasped a handle, the system does not take any further action as shown at step 243. However, if a user has grasped a handle as sensed by the capacitive sensors, operation proceeds to step 242 and the PEPS control module 168 sends a signal to the body control module 154 to unlock the specified vehicle door, tailgate, deck lid, etc. It will be understood that the system 150 may be configured to directly open the specified door, gate, or deck lid to provide a faster response time/operation It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A keyless entry and keyless ignition system for vehicles, comprising:
    a vehicle latch including an electrically powered lock;
    an exterior vehicle handle having a capacitive sensor;
    a keyless vehicle ignition system including a user input feature; and
    a main electrical power supply operably connected to the electrically powered lock;
    a backup electrical power supply that is configured to provide electrical power to actuate and unlock the electrically powered lock in the event the main electrical power supply is unavailable;
    an exterior device configured to permit entry of an authorization code by a user;
    a vehicle control and communication system including a GPS system and first and second wireless transmitters and receivers, wherein the first transmitter and the first receiver are configured to transmit and receive short range wireless signals to and from, respectively, a wireless device, and wherein the second transmitter and second receiver are configured to transmit and receive cellular wireless signals to a cellular phone network;
    wherein the vehicle control and communication system is configured to provide a dormant mode in which short range wireless signals are not sent or received by the first transmitter and first receiver, respectively, and an awake mode in which the first transmitter and first receiver transmit and receive, respectively, short range wireless signals;
    wherein the control and communication system is configured to receive cellular wireless signals including GPS location data utilizing the second transmitter when the control and communication system is in the dormant mode, and wherein the control and communication system is configured to switch to the active mode and send a short range wireless verification signal request utilizing the first transmitter if a cellular wireless wakeup signal is received by the second receiver;
    wherein the control and communication system is configured to unlock the electrically powered latch if an authorized wireless identification signal is received from an authorized wireless mobile cellular device and if the capacitive sensor detects a user's hand engaging the exterior vehicle handle;
    wherein the control and communication system is configured to activate the keyless vehicle ignition system upon receiving a signal from the user input feature if an authorized wireless identification signal is received from an authorized wireless mobile cellular device;
    and wherein the control and communication system causes the vehicle latch to unlock utilizing electrical power from either the main electrical power supply or the backup electrical power supply if an authorized security code is input using the exterior device.

2. The keyless entry and keyless ignition system of claim 1, wherein:
    the second transmitter and the second receiver are configured to transmit and receive, respectively, wireless signals at about 824-896 MHz and/or 1850-1990 MHz.

3. The keyless entry and keyless ignition system of claim 1, wherein:
    the vehicle latch defines an inner zone having a first boundary extending around the vehicle latch;
    the keyless entry and keyless ignition system defines an outer zone having a second boundary that extends around the first boundary at a greater distance from the vehicle latch; and
    the control and communication system is configured to switch from the awake mode to the dormant mode if an authorized cellular device is not detected within the outer zone for a period of time exceeding a predefined period of time.

4. The keyless entry and keyless ignition system of claim 3, wherein:
    the predefined period of time is at least five minutes.

5. The keyless entry and keyless ignition system of claim 3, wherein:
    the control and communication system is configured to continue to receive wireless cellular signals from a mobile cellular device when the mobile cellular device is outside the outer zone.

6. The keyless entry and keyless ignition system of claim 1, wherein:
    the vehicle latch defines an inner zone having a first boundary extending around the vehicle latch;
    the keyless entry and keyless ignition system defines an outer zone having a second boundary that extends around the first boundary at a greater distance from the vehicle latch;
    if the keyless entry and keyless ignition system receives a wireless cellular wake up signal from a wireless mobile cellular device and switches to the active mode, the keyless entry and keyless ignition system does not unlock the electrically powered latch unless an authorized wireless mobile device is within the inner zone.

7. The keyless entry and keyless ignition system of claim 6, wherein:
    the keyless entry and keyless ignition system includes a passive entry, passive start (PEPS) module defining active and inactive states; and
    the keyless entry and keyless ignition system includes a WiFi module comprising the second transmitter and the second receiver; and
    the WiFi module activates the PEPS module if an authorized short range wireless signal is received by the first receiver.

8. The keyless entry and keyless ignition system of claim 1, wherein:
    the second transmitter and the second receiver are configured to transmit and receive long range wireless cellular signals directly with a wireless mobile cellular device without the use of cellular towers.

9. The keyless entry and keyless ignition system of claim 8, wherein:

the keyless entry and keyless ignition system is configured to transmit and receive wireless signals in the 800 MHz and/or 1900 MHz band directly with a wireless mobile cellular device.

10. The keyless entry and keyless ignition system of claim 1, wherein:
the vehicle latch defines an inner zone having a first boundary extending around the vehicle latch;
the keyless entry and keyless ignition system defines an outer zone having a second boundary that extends around the first boundary at a greater distance from the vehicle latch; and
the keyless entry and keyless ignition system is configured to transmit and receive wireless signals in the 800 MHz and/or 1900 MHz band directly with a wireless mobile cellular device that is outside the second boundary.

11. The keyless entry and keyless ignition system of claim 1, wherein:
the exterior device comprises a plurality of touch pads.

12. A keyless entry and keyless ignition system for vehicles, comprising:
a vehicle latch including an electrically powered lock;
an exterior vehicle handle having a capacitive sensor;
a keyless vehicle ignition system including a user input feature;
a main electrical power supply operably connected to the electrically powered lock;
a backup electrical power supply that is configured to provide electrical power to actuate and unlock the electrically powered lock in the event the main electrical power supply is unavailable;
an exterior identification device that is configured to determine if a user is authorized; and
a vehicle control and communication system including first and second wireless transmitters and receivers, wherein the first transmitter and the first receiver are configured to transmit and receive short range wireless signals to and from, respectively, a wireless device, and wherein the second transmitter and second receiver are configured to transmit and receive cellular wireless signals to a cellular phone network;
wherein the vehicle control and communication system is configured to provide a dormant mode in which short range wireless signals are not sent or received by the first transmitter and first receiver, respectively, and an awake mode in which the first transmitter and first receiver transmit and receive, respectively, short range wireless signals;
the vehicle latch defines an inner zone having a first boundary extending around the vehicle latch;
the keyless entry and keyless ignition system defines an outer zone having a second boundary that extends around the first boundary at a greater distance from the vehicle latch;
wherein the control and communication system is configured to switch from the dormant mode to the active mode and send a wireless verification signal request utilizing at least one of the first transmitter and the second transmitter if a cellular wireless wakeup signal is received by the second receiver;
wherein the control and communication system is configured to unlock the electrically powered latch if an authorized wireless identification signal is received from an authorized wireless mobile cellular device and if the capacitive sensor detects a user's hand engaging the exterior vehicle handle;
and wherein the control and communication system causes the vehicle latch to unlock utilizing electrical power from either the main electrical power supply or the backup electrical power supply if the exterior identification device determines that a user is authorized.

13. The keyless entry and keyless ignition system of claim 12, wherein:
the control and communication system is configured to activate the keyless vehicle ignition system upon receiving a signal from the user input feature if an authorized wireless identification signal is received from an authorized wireless mobile cellular device.

14. The keyless entry and keyless ignition system of claim 12, wherein:
the exterior identification device is configured to permit manual entry of a security code.

15. The keyless entry and keyless ignition system of claim 12, wherein:
the vehicle control and communication system includes a GPS system; and
the second transmitter is configured to transmit cellular wireless signals including GPS data concerning a location of the vehicle whereby a wireless cellular device having a GPS system can determine if it is within the outer zone.

16. The keyless entry and keyless ignition system of claim 12, wherein:
the second transmitter and the second receiver are configured to transmit and receive, respectively, wireless signals at about 824-896 MHz and/or 1850-1990 MHz.

17. The keyless entry and keyless ignition system of claim 12, wherein:
the control and communication system is configured to continue to receive wireless cellular signals from a mobile cellular device when the mobile cellular device is outside the outer zone.

18. The keyless entry and keyless ignition system of claim 12, wherein:
if the keyless entry and keyless ignition system receives a wireless cellular wake up signal from a wireless mobile cellular device and switches to the active mode, the keyless entry and keyless ignition system does not unlock the electrically powered latch unless an authorized wireless mobile device is within the inner zone.

* * * * *